(12) United States Patent
Endo et al.

(10) Patent No.: US 11,283,331 B2
(45) Date of Patent: Mar. 22, 2022

(54) ROTATING ELECTRIC MACHINE

(71) Applicant: DENSO CORPORATION, Kariya (JP)

(72) Inventors: Hiroshi Endo, Kariya (JP); Shohei Yoshioka, Kariya (JP)

(73) Assignee: DENSO CORPORATION, Kariya (JP)

( * ) Notice: Subject to any disclaimer, the term of this patent is extended or adjusted under 35 U.S.C. 154(b) by 249 days.

(21) Appl. No.: 16/585,017

(22) Filed: Sep. 27, 2019

(65) Prior Publication Data

US 2020/0106341 A1 Apr. 2, 2020

(30) Foreign Application Priority Data

Sep. 27, 2018 (JP) .............................. JP2018-182964
Jul. 18, 2019 (JP) .............................. JP2019-132673

(51) Int. Cl.
*H02K 9/19* (2006.01)
*H02K 9/28* (2006.01)
*H02K 1/2706* (2022.01)
*H02K 5/20* (2006.01)

(52) U.S. Cl.
CPC ............. *H02K 9/19* (2013.01); *H02K 1/2706* (2013.01); *H02K 5/20* (2013.01); *H02K 9/28* (2013.01)

(58) Field of Classification Search
CPC .. H02K 9/16; H02K 9/19; H02K 9/18; H02K 9/197; H02K 9/20; H02K 9/06; H02K 5/20; H02K 5/02; H02K 5/20927; H02K 5/04; H02K 5/08
See application file for complete search history.

(56) References Cited

U.S. PATENT DOCUMENTS

| 2014/0328670 A1* | 11/2014 | Lamb | F04D 29/5813 |
| | | | 415/119 |
| 2017/0012502 A1* | 1/2017 | Saiki | H02K 1/12 |

FOREIGN PATENT DOCUMENTS

JP        2014-166031 A       9/2014

* cited by examiner

*Primary Examiner* — Bryan R Perez
(74) *Attorney, Agent, or Firm* — Oliff PLC

(57) ABSTRACT

A rotating electric machine includes a rotating shaft, a rotor fixed on the rotating shaft, a stator arranged to radially face the rotor, and a housing having a tubular part. The tubular part has the stator assembled thereto on a radially inner or radially outer side thereof. Moreover, the tubular part has an inner wall portion and an outer wall portion that are radially spaced from and radially face each other. Between the inner wall portion and the outer wall portion, there is formed an annular coolant passage through which coolant flows. On an external surface of the tubular part of the housing on an opposite radial side to the stator, at least one elongate protrusion is formed, in an axial range where the at least one elongate protrusion radially overlaps the coolant passage, to extend obliquely or parallel to an axial direction of the rotating shaft.

12 Claims, 12 Drawing Sheets

ROTATING ELECTRIC MACHINE

CROSS-REFERENCE TO RELATED APPLICATIONS

This application is based on and claims priority from Japanese Patent Applications No. 2018-182964 filed on Sep. 27, 2018 and No. 2019-132673 filed on Jul. 18, 2019, the contents of which are hereby incorporated by reference in their entirety into this application.

BACKGROUND

1. Technical Field

The present disclosure relates to rotating electric machines.

2. Description of Related Art

Conventionally, there has been known a technique of forming, for reducing noise and vibration in a rotating electric machine, ribs on an outer circumferential surface of a housing to protrude radially outward from the outer circumferential surface; the housing is provided to surround a stator of the rotating electric machine.

SUMMARY

According to the present disclosure, a rotating electric machine is provided which includes a rotating shaft, a rotor fixed on the rotating shaft, a stator arranged to radially face the rotor, and a housing having a tubular part. The tubular part has the stator assembled thereto on a radially inner or radially outer side thereof. Moreover, the tubular part has an inner wall portion and an outer wall portion that are radially spaced from and radially face each other. Between the inner wall portion and the outer wall portion, there is formed an annular coolant passage through which coolant flows. On an external surface of the tubular part of the housing on an opposite radial side to the stator, at least one elongate protrusion is formed, in an axial range where the at least one elongate protrusion radially overlaps the coolant passage, to extend obliquely or parallel to an axial direction of the rotating shaft.

DESCRIPTION OF EMBODIMENTS

Figure 1:
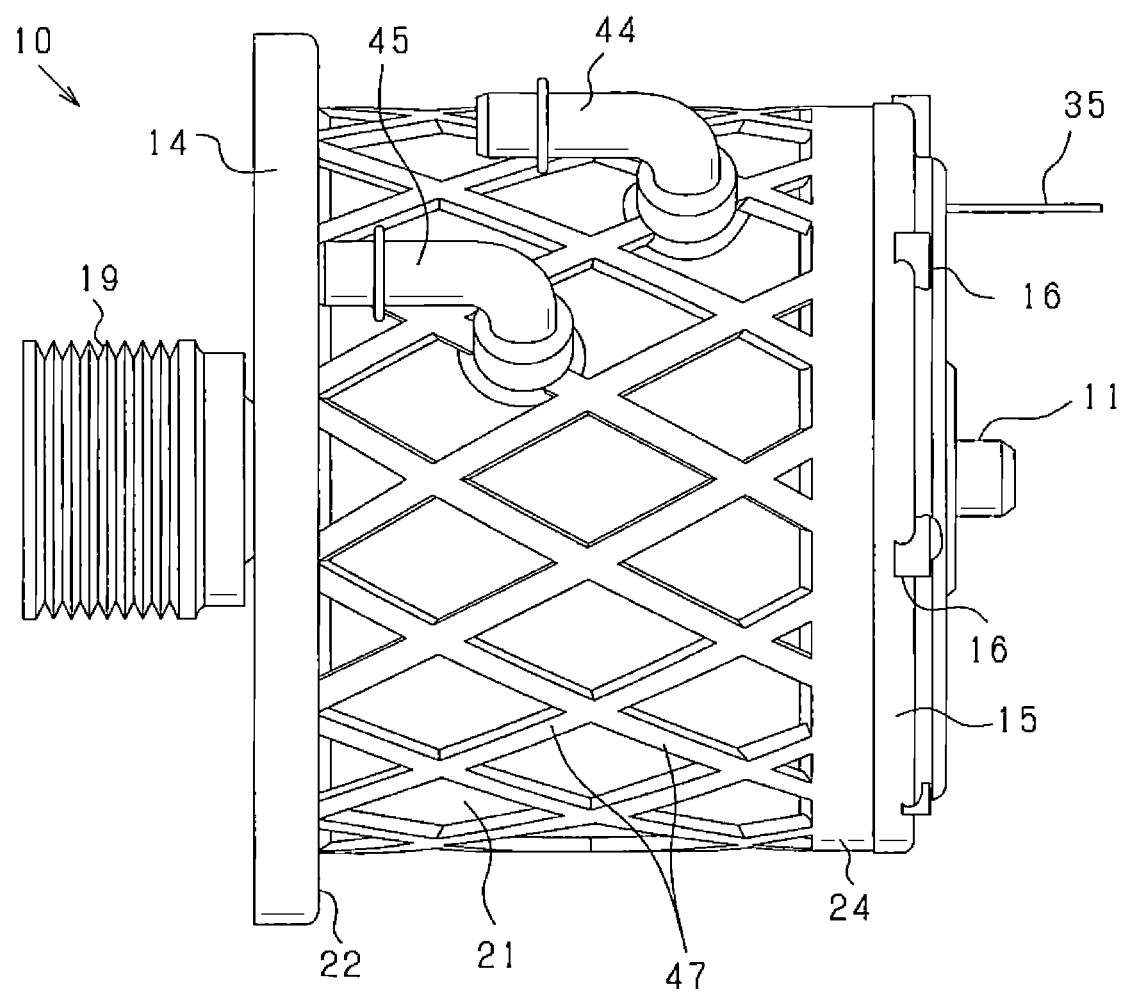
FIG. 1 is a front view showing the external appearance of a rotating electric machine according to a first embodiment.

For example, Japanese Patent Application Publication No. JP2014166031A discloses a rotating electric machine. In this rotating electric machine, a plurality of inner ribs are provided in a cooling water flow path, which is formed in a housing, to partition the cooling water flow path into a plurality of flow path sections. Moreover, a plurality of outer ribs are provided on an outer circumferential surface of the housing to protrude radially outward from the outer circumferential surface and extend in a circumferential direction of the housing; each of the outer ribs is located to radially overlap a corresponding one of the flow path sections. With the outer ribs, it is possible to suppress membrane vibration on the back side of the cooling water flow path (or on the outer circumferential surface of the housing).

On the other hand, when a rotating electric machine operates in a torque generation mode or in an electric power generation mode, a reaction force to shaft torque (i.e., torque acting on a rotating shaft) is applied to the stator, causing the housing to receive a moment load that depends on the shaft torque. In terms of reducing vibration of the housing caused by torque ripple in the rotating electric machine, it is important to improve torsional rigidity of the housing.

However, in the rotating electric machine disclosed in the above patent document, with the outer ribs formed on the outer circumferential surface of the housing to extend in the circumferential direction (i.e., extend perpendicular to the axial direction of the housing), improvement in the torsional rigidity of the housing cannot be expected. Consequently, it may be impossible to sufficiently reduce noise and vibration particularly when the rotating electric machine is under high load.

In contrast, in the above-described rotating electric machine according to the present disclosure, with the at least one elongate protrusion formed on the external surface of the tubular part of the housing on the opposite radial side to the stator, it is possible to improve the torsional rigidity of the tubular part of the housing over the axial range where the at least one elongate protrusion radially overlaps the coolant passage. More specifically, when circumferential reaction stress (or reaction force to torque acting on the rotating shaft) is induced on the stator side during rotation of the rotor, it is possible for the tubular part of the housing to evenly receive the stress over the axial range. Consequently, it is possible to effectively reduce membrane vibration of the tubular part. As a result, it is possible to improve the torsional rigidity of the tubular part of the housing, thereby reducing noise and vibration caused by torque ripple in the rotating electric machine.

In the above-described rotating electric machine according to the present disclosure, the at least one elongate protrusion may include a first elongate protrusion extending in a first direction inclined from the axial direction to one side in a circumferential direction and a second elongate protrusion extending in a second direction inclined from the axial direction to the other side in the circumferential direction. In the axial range where the at least one elongate protrusion radially overlaps the coolant passage, the first elongate protrusion and the second elongate protrusion may preferably intersect each other.

With the above configuration, it is possible to further improve the torsional rigidity of the tubular part of the housing and thereby more effectively reduce membrane vibration on the back side of the coolant passage (or on the external surface of the tubular part on the opposite radial side to the stator) in comparison with the case of the first and second elongate protrusions extending without intersecting each other.

As an alternative, the at least one elongate protrusion may include first and second elongate protrusions which extend obliquely to the axial direction and parallel to each other and which are spaced in a circumferential direction. In the axial range where the at least one elongate protrusion radially overlaps the coolant passage, a first circumferential range where the first elongate protrusion is provided and a second circumferential range where the second elongate protrusion is provided may preferably partially overlap each other.

With the above configuration, it is possible to further improve the torsional rigidity of the tubular part of the housing and thereby more effectively reduce membrane vibration on the back side of the coolant passage in comparison with the case of configuring the first and second elongate protrusions to have their circumferential ranges not overlapping each other.

In a further implementation, the rotating electric machine further includes a cover that is fixed to an axial end portion of the tubular part of the housing by a plurality of fastening members. The at least one elongate protrusion includes a plurality of elongate protrusions that are integrally connected with the axial end portion of the tubular part. The fastening members are fastened to fix the cover to the axial end portion of the tubular part at or in close vicinity to locations where the elongate protrusions are integrally connected with the axial end portion of the tubular part.

In general, the housing is configured to have high rigidity (e.g., have a large thickness) at locations where the fastening of the fastening members is performed. Therefore, with the elongate protrusions integrally connected with the axial end portion of the tubular part at or in close vicinity to locations where the fastening of the fastening members is performed, it is possible to further improve the rigidity of the tubular part of the housing.

Moreover, the housing has a flange formed to radially protrude from an axial end portion of the tubular part. The flange is configured to be fixed to a fixing target by a plurality of fastening members. The at least one elongate protrusion includes a plurality of elongate protrusions that are integrally connected with the flange. The fastening members are fastened to fix the flange to the fixing target at or in close vicinity to locations where the elongate protrusions are integrally connected with the flange.

As mentioned above, in general, the housing is configured to have high rigidity at locations where the fastening of the fastening members is performed. Therefore, with the elongate protrusions integrally connected with the flange at or in close vicinity to locations where the fastening of the fastening members is performed, it is possible to further improve the rigidity of the tubular part of the housing.

In a yet further implementation, the tubular part of the housing has a connecting portion that is provided in the coolant passage to radially connect the inner wall portion and the outer wall portion. The at least one elongate protrusion is located to radially overlap the connecting portion.

With the connecting portion, it is possible to further improve the rigidity of the tubular part of the housing, thereby more effectively reducing membrane vibration on the back side of the coolant passage.

The connecting portion may be a partition portion that extends between the inner wall portion and the outer wall portion to partition the coolant passage. The at least one elongate protrusion may preferably be formed so that when viewed along a radial direction, the at least one elongate protrusion intersects the partition portion.

With the above configuration, the at least one elongate protrusion and the partition portion, which are respectively provided on opposite radial sides of the outer wall portion or the inner wall portion of the tubular part of the housing, radially overlap each other, thereby effectively reinforcing the outer wall portion or the inner wall portion. In addition, since the at least one elongate protrusion is formed to extend obliquely or parallel to the axial direction, the at least one elongate protrusion reliably intersects the partition portion, thereby reliably reinforcing the outer wall portion or the inner wall portion.

The at least one elongate protrusion may include a first elongate protrusion extending in a first direction inclined from the axial direction to one side in a circumferential direction and a second elongate protrusion extending in a second direction inclined from the axial direction to the other side in the circumferential direction. The first elongate protrusion and the second elongate protrusion may preferably intersect each other at an intersection therebetween. The intersection between the first elongate protrusion and the second elongate protrusion may preferably be located to radially overlap the connecting portion.

With the above configuration, it is possible to further improve the rigidity of the tubular part of the housing.

In a still further implementation, the at least one elongate protrusion has a large-height portion and a small-height portion. The large-height portion extends in a longitudinal direction of the at least one elongate protrusion to cross the coolant passage. The small-height portion extends in the longitudinal direction of the at least one elongate protrusion without crossing the coolant passage. The radial height of the large-height portion is set to be larger than the radial height of the small-height portion.

With the above configuration, since the radial height of the large-height portion, which extends to cross the coolant passage, is set to be larger, it is possible to reinforce a part of the outer wall portion or the inner wall portion of the tubular part of the housing which corresponds to an antinode of membrane vibration of the tubular part, thereby effectively reducing the membrane vibration. Moreover, since the at least one elongate protrusion is shaped to be concave and convex in the longitudinal direction thereof, the surface area of the housing is further increased, thereby further improving the air-cooling effect. Furthermore, since the radial height of the small-height portion, which extends without crossing the coolant passage, is to be smaller, it is possible to suppress the weight and size of the entire housing from being increased.

The stator may include a stator core and a stator coil wound on the stator core. On the radially inner or radially outer side of the tubular part of the housing, the stator core may be fitted to the tubular part with a predetermined interference therebetween.

With the above configuration, radial stress (residual stress) may be induced in the tubular part and the amplitude of the radial stress at a portion of the tubular part where the coolant passage (i.e., a cavity) is formed may be different from that at the other portions of the tubular part. In this case, due to the variation in the radial stress in the tubular part, there would be variation in the joining state between the tubular part and the stator core, thereby affecting heat conduction from the stator core to the tubular part and making it impossible to reliably retain the stator core by the tubular part.

In this regard, by configuring the at least one elongate protrusion to have the large-height portion extending to cross the coolant passage and the small-height portion extending without crossing the coolant passage and setting the radial height of the large-height portion to be larger than the radial height of the small-height portion, it is possible to reduce variation in the radial stress in the tubular part, thereby facilitating heat conduction from the stator core to the tubular part and making it possible to reliably retain the stator core by the tubular part.

Moreover, the tubular part of the housing may have a partition portion that extends in a circumferential direction between the inner wall portion and the outer wall portion to partition the coolant passage into coolant passage sections in the axial direction. The large-height portion may extend, in the longitudinal direction of the at least one elongate protrusion, to cross one of the coolant passage sections. The small-height portion may extend, in the longitudinal direction of the at least one elongate protrusion, to cross the partition portion of the tubular part of the housing.

With the above configuration, the partition portion is formed at an axially intermediate position in the tubular part, i.e., at an intermediate position between opposite axial ends of the coolant passage. Consequently, with the partition portion, the radial fastening force of the tubular part of the housing to the stator core is secured at the axially intermediate position in the tubular part. Further, setting the radial height of the large-height portion of the at least elongate protrusion to be larger than the radial height of the small-height portion of the at least one elongate protrusion, it is possible to realize stress equalization in the tubular part of the housing.

In addition, forming the at least one protrusion to extend obliquely to the axial direction, it is possible to more reliably realize stress equalization in the entire tubular part of the housing.

In another further implementation, the tubular part of the housing is constituted of an inner tubular member having the inner wall portion formed therein and an outer tubular member having the outer wall portion formed therein. The inner tubular member and the outer tubular member are jointed to each other with seal members interposed therebetween to seal the coolant passage.

With the above configuration, when torsional deformation of the tubular part of the housing occurs, the sealing performance of the seal members may be lowered due to the torsional deformation. For example, local reduction in compressive force may occur at locations where the seal members are provided, thereby causing leakage of the coolant.

In this regard, with the at least one elongate protrusion formed in the tubular part of the housing, the torsional rigidity of the tubular part is improved. Consequently, it is possible to suppress torsional deformation of the tubular part of the housing, thereby suppressing the sealing performance of the seal members from being lowered.

Exemplary embodiments will be described hereinafter with reference to FIGS. 1-15. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

Figure 2:
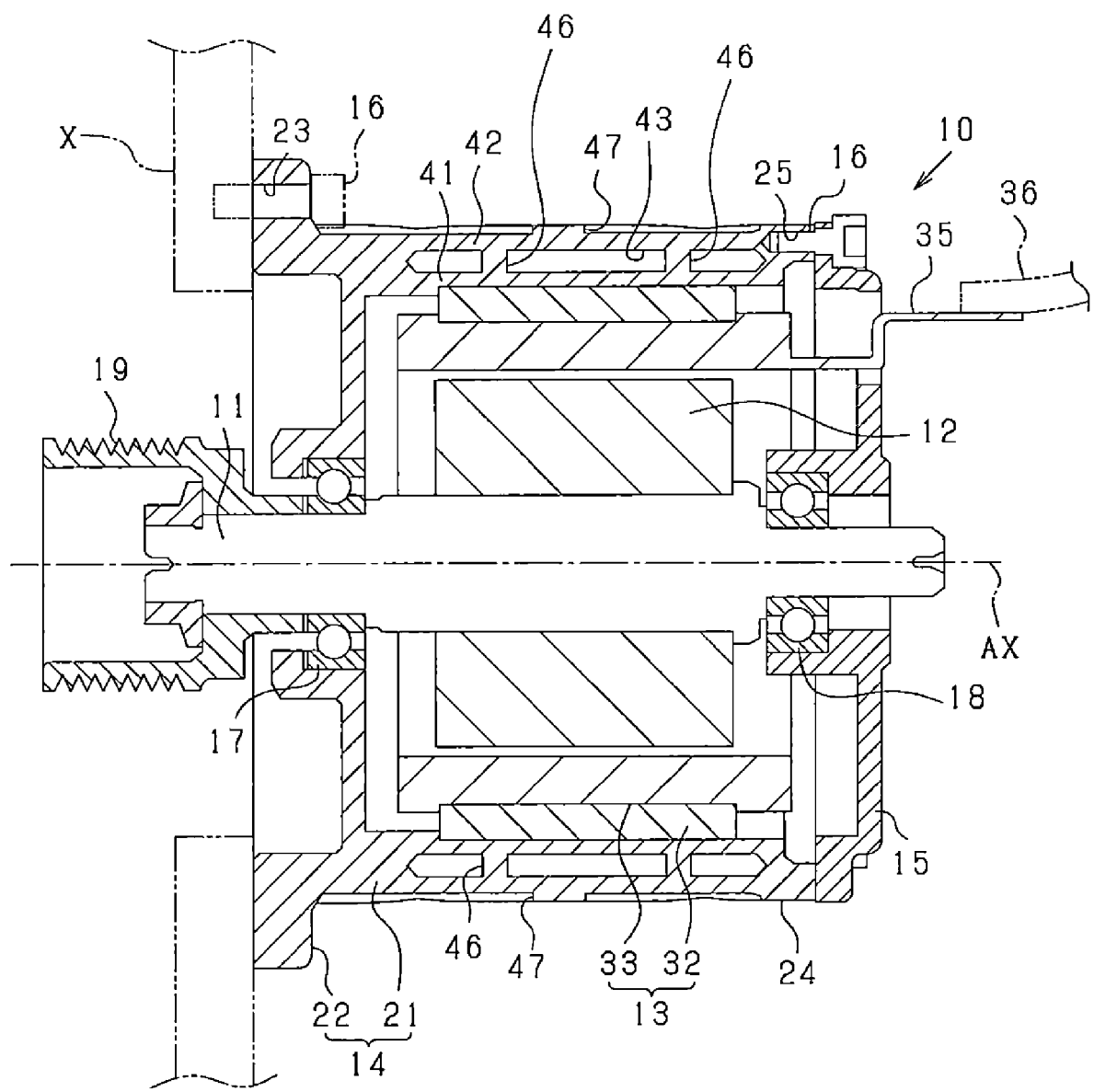
FIG. 2 is a longitudinal cross-sectional view of the rotating electric machine.

FIGS. 1 and 2 show the overall configuration of a rotating electric machine 10 according to the first embodiment.

In the present embodiment, the rotating electric machine 10 is designed to be used as a mechanical power source in, for example, a vehicle. It should be noted that the rotating electric machine 10 may also be used for other applications, such as industrial, marine, aviation, household, office automation and amusement applications.

More particularly, in the present embodiment, the rotating electric machine 10 is configured as an inner rotor type multi-phase AC motor. In addition, the rotating electric machine 10 may be either a synchronous motor or an induction motor.

FIG. 1 shows the external appearance of the rotating electric machine 10. FIG. 2 shows a longitudinal cross section of the rotating electric machine 10, which is taken along the central axis AX of a rotating shaft 11 of the rotating electric machine 10. Hereinafter, the direction in which the central axis AX of the rotating shaft 11 extends will be referred to as axial direction; the directions of extending radially from the central axis AX will be referred to as radial directions; and the direction of extending along a circle whose center is on the central axis AX will be referred to as circumferential direction.

As shown in FIGS. 1 and 2, the rotating electric machine 10 includes a rotor 12 fixed on the rotating shaft 11, a stator 13 located to surround the rotor 12, a housing 14 that receives both the rotor 12 and the stator 13 therein, and a cover 15 fixed to one axial end of the housing 14. The rotor 12 and the stator 13 are coaxially arranged to radially face each other. The housing 14 is formed in a bottomed tubular shape having one axial end open. To the open end of the housing 14, there is mounted the cover 15 by a plurality of bolts 16 (i.e., fastening members). In the housing 14 and the cover 15, there are provided bearings 17 and 18 via which the rotating shaft 11 and the rotor 12 are rotatably supported. On an axial end portion (i.e., left end portion in FIG. 2) of the rotating shaft 11, there is mounted a pulley 19.

As shown in FIG. 2, the housing 14 has: a tubular part 21 that is cylindrical in shape and has the stator 13 assembled thereto on the radially inner side thereof; and an annular flange 22 that protrudes radially outward from an axial end portion (i.e., left end portion in FIG. 2) of the tubular part 21. The stator 13 is fixed, for example by shrinkage fitting or press fitting, to the tubular part 21 of the housing 14 with a predetermined interference therebetween. The flange 22 is provided as a fixing part for fixing the rotating electric machine 10 to a fixing target X (e.g., a frame of the vehicle). In the flange 22, there are formed a plurality of fastening holes 23 at predetermined intervals in the circumferential direction. The flange 22 is fixed to the fixing target X by a plurality of bolts 16 (i.e., fastening members) that extend respectively through the fastening holes 23.

Moreover, on the opposite axial end of the tubular part 21 to the flange 22, there is formed an annular portion 24. In the annular portion 24, there are formed a plurality of fastening holes 25 at predetermined intervals in the circumferential direction. The fastening holes 25 extend in the axial direction and open on an axial end face of the tubular part 21 (more specifically, the annular portion 24 of the tubular part 21). The cover 15 is fixed to the annular portion 24 of the tubular part 21 by the plurality of bolts 16 that extend respectively through the fastening holes 25.

The rotor 12 includes: a rotor core that is formed by laminating a plurality of magnetic steel sheets in the axial direction and fixed on the rotating shaft 11; and a plurality of permanent magnets retained in the rotor core.

Figure 3:
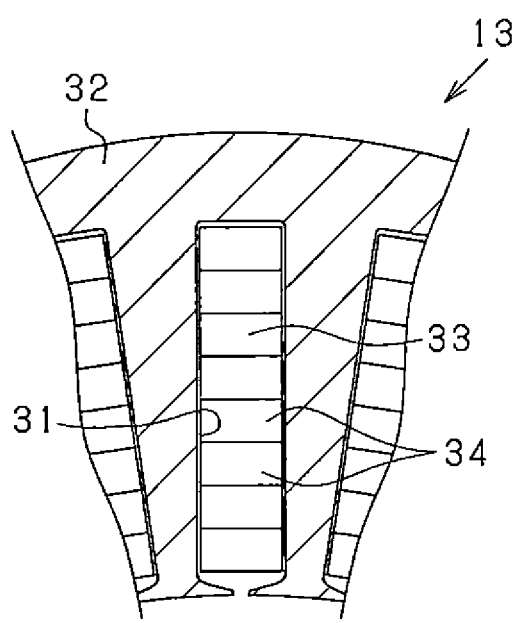
FIG. 3 is a cross-sectional view of part of a stator of the rotating electric machine.

As shown in FIG. 3, the stator 13 includes: an annular stator core 32 having a plurality of slots 31 arranged in the circumferential direction; and a multi-phase stator coil 33 wound on the stator core 32 so as to be received in the slots 31. The stator core 32 is formed by laminating a plurality of annular magnetic steel sheets in the axial direction and fixing them together by, for example, staking. The stator coil 33 is formed of electric conductor wires 34 that have a rectangular cross-sectional shape and are inserted in a plurality of radially-aligned layers in each of the slots 31.

As shown in FIG. 2, the stator coil 33 is comprised of a plurality of phase windings each of which has a terminal 35 axially protruding outside the cover 15. To the terminal 35, there is connected an electric power harness 36.

In the rotating electric machine 10 configured as described above, energization of the stator coil 33 is controlled by an inverter and a controller both of which are not shown in the figures. Consequently, by controlling energization of the stator coil 33, it is possible to control torque acting on the rotating shaft 11 during operation of the rotating electric machine 10 in a torque generation mode or in an electric power generation mode.

In the present embodiment, the rotating electric machine 10 has a water-cooled structure that uses cooling water as a coolant. Hereinafter, the water-cooled structure will be described in detail. In addition, it should be noted that the rotating electric machine 10 may alternatively be cooled by other coolants, such as lubricating oil.

As shown in FIG. 2, the tubular part 21 of the housing 14 has an inner wall portion 41 and an outer wall portion 42 that are radially spaced from and radially face each other. Between the inner wall portion 41 and the outer wall portion 42, there is formed an annular cooling water passage 43 through which cooling water flows.

In the present embodiment, the rotating electric machine 10 is of the inner rotor type. Accordingly, the inner wall portion 41 corresponds to a stator-side wall portion (i.e., wall portion on the stator 13 side) and the outer wall portion 42 corresponds to an anti-stator-side wall portion (i.e., wall portion on the opposite side to the stator 13). The cooling water passage 43 corresponds to a coolant passage.

The cooling water passage 43 is located in the axial direction so as to radially overlap the stator core 32. At both axial ends of the cooling water passage 43, the inner wall portion 41 and the outer wall portion 42 are integrally connected to close the cooling water passage 43.

In the present embodiment, the annular cooling water passage 43 has a width in the axial direction greater than the axial length of the stator core 32.

As shown in FIG. 1, in the tubular part 21 of the housing 14, there are formed both an inlet port 44 and an outlet port 45 so as to protrude radially outward. To the inlet port 44 and the outlet port 45, there are respectively connected a cooling water intake pipe and a cooling water exhaust pipe both of which are not shown in the figures. In operation, cooling water flows from the cooling water intake pipe into the cooling water passage 43 via the inlet port 44, then flows through the cooling water passage 43, and thereafter flows out of the cooling water passage 43 to the cooling water exhaust pipe via the outlet port 45. In addition, though not shown in the figures, in the cooling water pipes, there are provided a cooling water pump (e.g., an electric pump) for circulating the cooling water and a heat dissipating device (e.g., a radiator) for dissipating heat of the cooling water flowing out of the cooling water passage 43.

The cooling water passage 43 may be configured in various manners as shown in FIGS. 4A-4D.

Figure 4A:
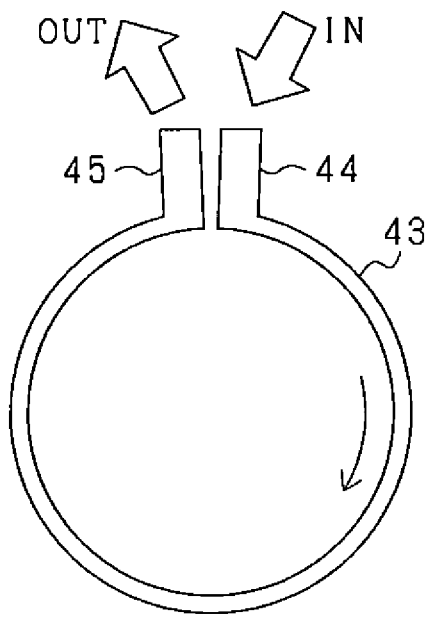
FIG. 4A is a schematic view illustrating a first configuration example of a cooling water passage formed in a tubular part of a housing of the rotating electric machine.

Specifically, in a first configuration example of the cooling water passage 43 shown in FIG. 4A, the inlet port 44 and the outlet port 45 are located in the tubular part 21 of the housing 14 so as to be close to each other in the circumferential direction. Moreover, the cooling water passage 43 extends along the circumferential direction. An inlet-side end portion of the cooling water passage 43 which communicates with the inlet port 44 and an outlet-side end portion of the cooling water passage 43 which communicates with the outlet port 45 are separated from each other. The circumferential range (or angular range) of the cooling water passage 43 is less than 360°.

Figure 4B:
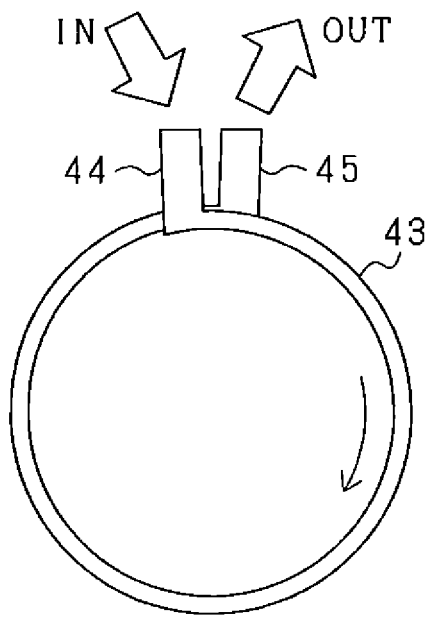
FIG. 4B is a schematic view illustrating a second configuration example of the cooling water passage.

In contrast, in a second configuration example of the cooling water passage 43 shown in FIG. 4B, the circumferential range of the cooling water passage 43 is over 360°. The inlet-side end portion of the cooling water passage 43 and the outlet-side end portion of the cooling water passage 43 are separated from, but overlap each other in the axial direction.

In addition, though not shown in the figures, the inlet port 44 and the outlet port 45 may be located at the same circumferential position so as to have the circumferential range of the cooling water passage 43 equal to 360°.

Figure 4C:
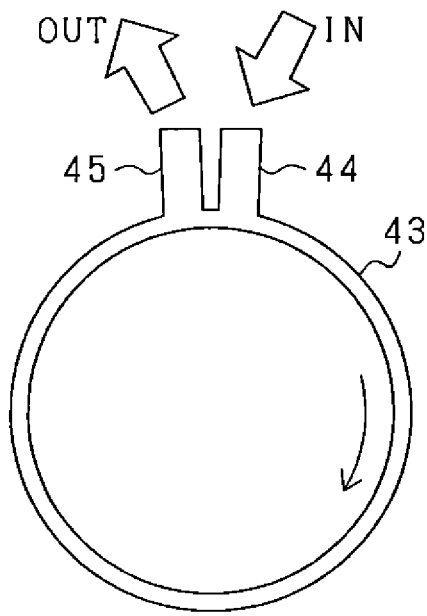
FIG. 4C is a schematic view illustrating a third configuration example of the cooling water passage.

In a third configuration example of the cooling water passage 43 shown in FIG. 4C, the cooling water passage 43 is formed in the shape of a circle without disconnected circumferential ends. The inlet port 44 and the outlet port 45 are fluidically connected to the cooling water passage 43 respectively at two circumferential positions close to each other.

Figure 4D:
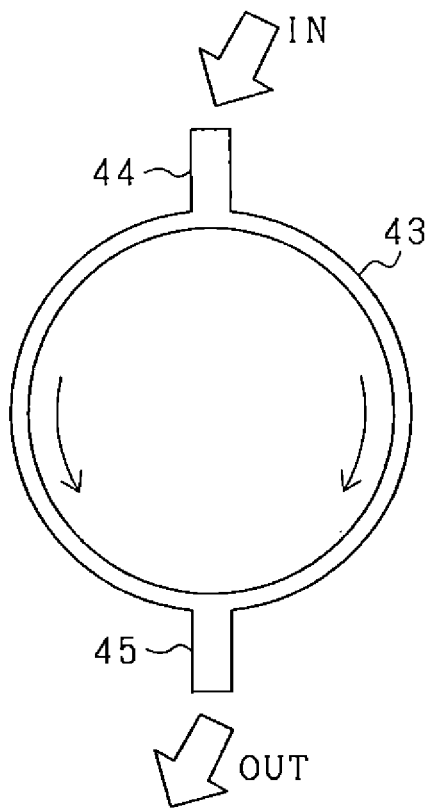
FIG. 4D is a schematic view illustrating a fourth configuration example of the cooling water passage.

In contrast, in a fourth configuration example of the cooling water passage 43 shown in FIG. 4D, the cooling water passage 43 is also formed in the shape of a circle without disconnected circumferential ends. However, the inlet port 44 and the outlet port 45 are fluidically connected to the cooling water passage 43 respectively at two circumferential positions separated from each other by 180°.

Referring back to FIG. 2, in the tubular part 21 of the housing 14, there are formed a plurality of partition portions 46 that partition the cooling water passage 43 into a plurality of cooling water passage sections in the axial direction. The partition portions 46 are provided as connecting portions that radially connect the inner wall portion 41 and the outer wall portion 42. Each of the partition portions 46 is formed to extend in the circumferential direction so that its longitudinal direction coincides with the circumferential direction.

Moreover, as shown in FIGS. 1 and 2, on an external surface of the tubular part 21 of the housing 14 on the radially outer side (i.e., on the opposite radial side to the stator 13), a plurality of elongate protrusions 47 are formed, in an axial range where the elongate protrusions 47 radially overlap the cooling water passage 43, to extend obliquely with respect to the axial direction.

In the present embodiment, the elongate protrusions 47 include first elongate protrusions 47 that extend in a first direction inclined from the axial direction to one side in the circumferential direction and second elongate protrusions 47 that extend in a second direction inclined from the axial direction to the other side in the circumferential direction. The first elongate protrusions 47 extend parallel to each other and are spaced at equal intervals in the circumferential direction. Similarly, the second elongate protrusions 47 extend parallel to each other and are spaced at equal intervals in the circumferential direction. Moreover, each of the first elongate protrusions 47 extends in its longitudinal direction (i.e., the first direction inclined from the axial direction to one side in the circumferential direction) to intersect a predetermined number of the second elongate protrusions 47. Similarly, each of the second elongate protrusions 47 extends in its longitudinal direction (i.e., the second direction inclined from the axial direction to the other side in the circumferential direction) to intersect a predetermined number of the first elongate protrusions 47. Each intersecting pair of the first and second elongate protrusions 47 forms a substantially "X" shape.

The partition portions 46 and the elongate protrusions 47 are provided respectively on the radially inner and radially outer sides of the outer wall portion 42 which defines, together with the inner wall portion 41, the cooling water passage 43. More specifically, in the tubular part 21 of the housing 14, the partition portions 46 are formed in the cooling water passage 43 whereas the elongate protrusions 47 are formed outside the cooling water passage 43.

As described above, to the annular portion 24 which is formed at the axial end of the tubular part 21 on the opposite side to the flange 22, there is fixed the cover 15 by the bolts 16. The elongate protrusions 47 are formed to be integrally connected with the annular portion 24. Further, the bolts 16 are fastened to fix the cover 15 to the annular portion 24 of the tubular part 21 of the housing 14 at or in close vicinity to locations where the elongate protrusions 47 are integrally connected with the annular portion 24.

Moreover, the elongate protrusions 47 are formed to be integrally connected with the flange 22 as well. Further, the bolts 16 are fastened to fix the flange 22 of the housing 14 to the fixing target X at or in close vicinity to locations where the elongate protrusions 47 are integrally connected with the flange 22.

Figure 5:
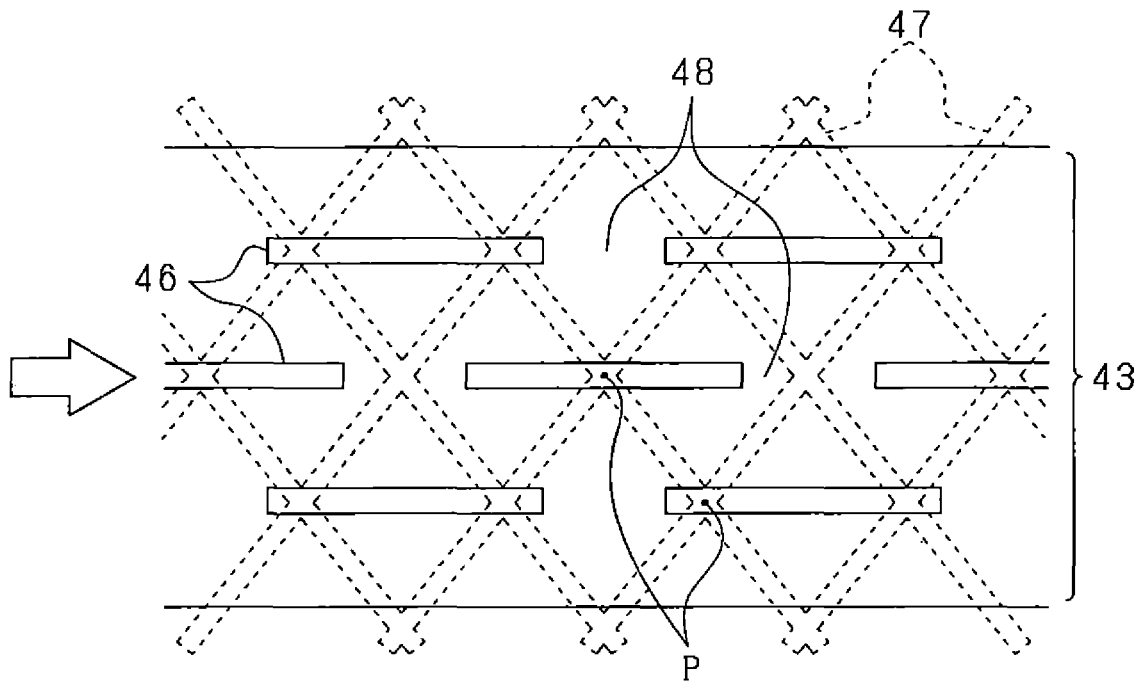
FIG. 5 is a development of part of the cooling water passage illustrating a first configuration example of partition portions of the tubular part of the housing.
Figure 6:
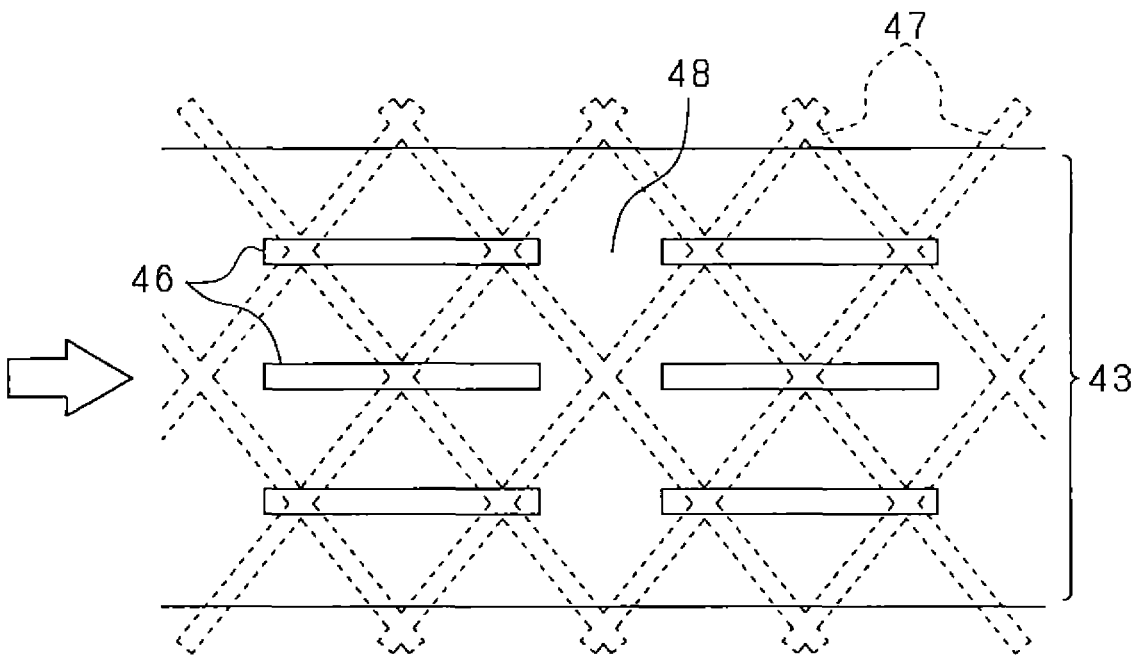
FIG. 6 is a development of part of the cooling water passage illustrating a second configuration example of the partition portions.
Figure 7:
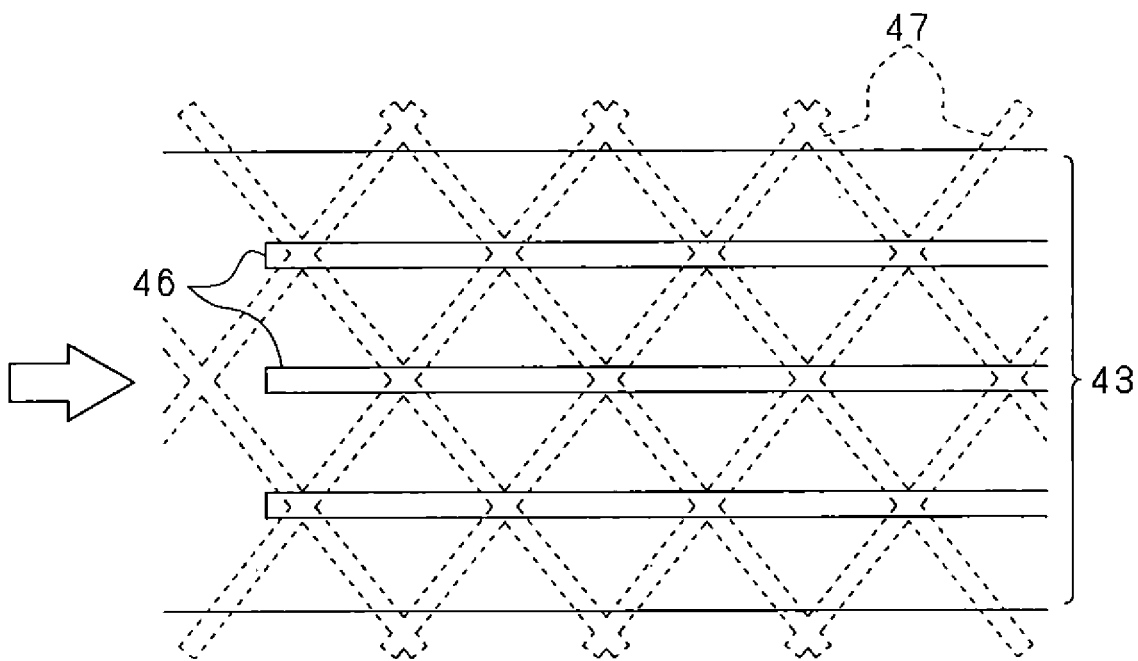
FIG. 7 is a development of part of the cooling water passage illustrating a third configuration example of the partition portions.

The partition portions 46 may be configured in various manners as shown in FIGS. 5-7.

It should be noted that in each of FIGS. 5-7: the partition portions 46, which are formed in the cooling water passage 43, are shown with solid lines; the elongate protrusions 47, which are formed on the external surface of the tubular part 21 of the housing 14, are shown with dashed lines; the vertical direction corresponds to the axial direction; and the horizontal direction corresponds to the circumferential direction.

In a first configuration example of the partition portions 46 shown in FIG. 5, the partition portions 46 are formed in three rows in the width direction of the cooling water passage 43 (i.e., in the axial direction), thereby partitioning the cooling water passage 43 into four cooling water passage sections. Moreover, each of the three rows consists of a predetermined number of the partition portions 46 that are separated from one another in the circumferential direction. Between each circumferentially-adjacent pair of the partition portions 46, there is formed a gap 48 through which the cooling water can flow in the axial direction. That is, all of the four cooling water passage sections partitioned by the partition portions 46 communicate with each other via the gaps 48 formed between the circumferentially-adjacent partition portions 46. Furthermore, for every two axially-adjacent rows, the partition portions 46 of one of the two rows are circumferentially offset from the partition portions 46 of the other of the two rows.

In the first configuration example of the partition portions 46 shown in FIG. 5, all of the partition portions 46 are configured to extend in the circumferential direction. As an alternative, all of the partition portions 46 may be configured to extend obliquely with respect to the circumferential direction. As another alternative, some of the partition portions 46 may be configured to extend in the circumferential direction whereas the remaining partition portions 46 may be configured to extend obliquely with respect to the circumferential direction. By suitably configuring the partition portions 46, it is possible to optimize the distribution of the flow speed of the cooling water in the cooling water passage 43, thereby smoothing the flow of the cooling water from the inlet port 44 to the outlet port 45 and facilitating discharge of air bubbles having entered the cooling water passage 43 along with the cooling water.

In addition, in the first configuration example of the partition portions 46 shown in FIG. 5, the number of rows of the partition portions 46 is set to three. Alternatively, the number of rows of the partition portions 46 may be set to two, or four or more.

In contrast to the partition portions 46 that are formed to extend in the circumferential direction (i.e., extend perpendicular to the axial direction) like the cooling water passage 43, the elongate protrusions 47 are formed to extend obliquely with respect to the axial direction. Consequently, when viewed along the radial direction, each of the elongate protrusions 47 intersects (or crosses) the corresponding partition portions 46. Moreover, the elongate protrusions 47 include the first elongate protrusions 47 and the second elongate protrusions 47 extending respectively in the first and second directions inclined from the axial direction respectively to opposite sides in the circumferential direction. Each of the intersections P between the first and second elongate protrusions 47 is located to radially overlap one of the partition portions 46.

The housing 14 is made by, for example, molding. In this case, the cooling water passage 43 is formed by using a core; all of the inner wall portion 41, the outer wall portion 42, the partition portions 46 and the elongate protrusions 47 of the tubular part 21 are formed integrally into one piece. That is, the housing 14 is a single integrally-formed body. In the present embodiment, the partition portions 46 are formed along the circumferential direction in the cooling water passage 43 of the tubular part 21; therefore, it becomes possible to simplify the structure of the cooling water passage 43. Moreover, since the partition portions 46 are provided in the form of being separated in the circumferential direction, it becomes easy to discharge the core sand during the molding of the housing 14. Consequently, it becomes possible to realize a configuration suitable for the manufacture of the housing 14, the flow of cooling water through the cooling water passage 43 and improvement of the rigidity of the partition portions 46.

In a second configuration example of the partition portions 46 shown in FIG. 6, the corresponding partition portions 46 of the three rows are aligned with each other in the width direction of the cooling water passage 43 (i.e., in the axial direction). In other words, the corresponding partition portions 46 of the three rows are located at the same circumferential position. Consequently, the corresponding gaps 48 formed between the partition portions 46 in the three rows are also aligned with each other in the width direction of the cooling water passage 43.

In a third configuration example of the partition portions 46 shown in FIG. 7, each row includes only a single partition portion 46 that extends in the circumferential direction and has two circumferential ends separated from each other with a gap formed therebetween; the gap communicates with the inlet port 44 and the outlet port 45.

Figure 8:
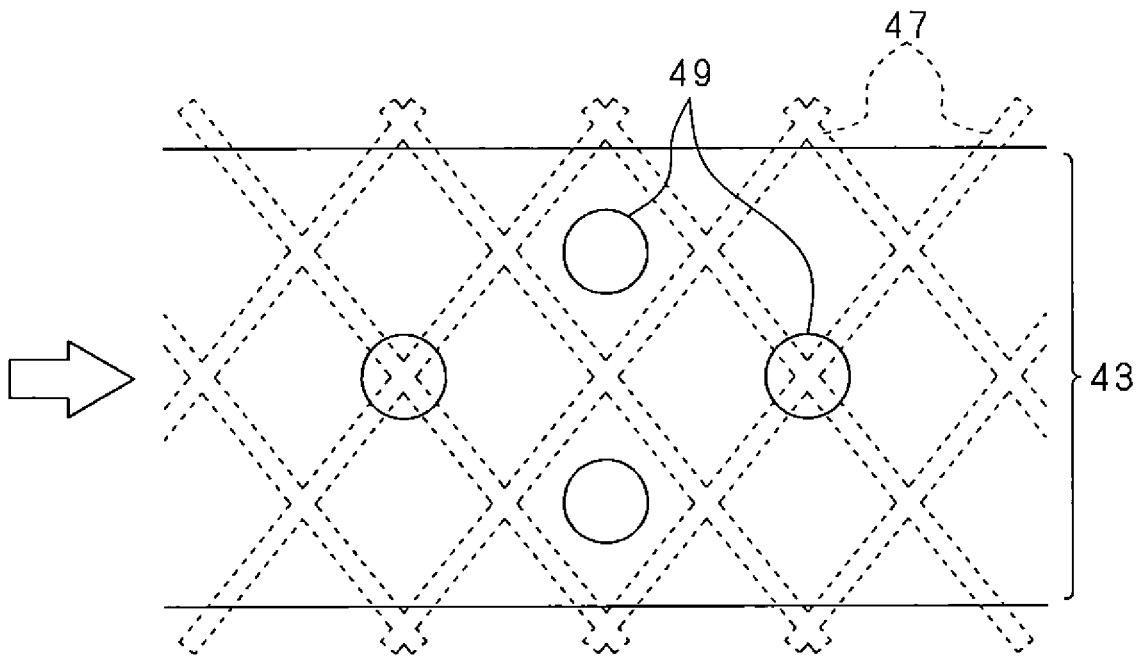
FIG. 8 is a development of part of the cooling water passage illustrating configuration of pillar portions of the tubular part of the housing which are provided instead of the partition portions.

Moreover, as shown in FIG. 8, as connecting portions that radially connect the inner wall portion 41 and the outer wall portion 42, in the cooling water passage 43, there may be formed pillar portions 49 instead of the above-described partition portions 46. Each of the pillar portions 49 may have a circular, quadrangular or triangular cross-sectional shape. Further, some of the elongate protrusions 47 may be formed to intersect (or cross), when viewed along the radial direction, the corresponding pillar portions 49.

In addition, as an alternative, in the cooling water passage 43, there may be formed both partition portions 46 and pillar portions 49 as connecting portions that radially connect the inner wall portion 41 and the outer wall portion 42.

According to the present embodiment, the following advantageous effects can be achieved.

In the rotating electric machine 10 according to the present embodiment, on the outer wall portion 42 of the tubular part 21 of the housing 14 which is on the opposite radial side to the stator 13, there are formed the elongate protrusions 47 that extend obliquely with respect to the axial direction over the axial range where the elongate protrusions 47 radially overlap the cooling water passage 43 (i.e., the axial range corresponding to the width of the annular cooling water passage 43). Consequently, it is possible to improve the torsional rigidity of the tubular part 21 of the housing 14 over the axial range. More specifically, when circumferential reaction stress (or reaction force to torque acting on the rotating shaft 11) is induced on the stator 13 side during rotation of the rotor 12, it is possible for the tubular part 21 of the housing 14 to evenly receive the stress over the axial range. Consequently, it is possible to effectively reduce membrane vibration of the tubular part 21. As a result, it is possible to improve the torsional rigidity of the tubular part 21 of the housing 14, thereby reducing noise and vibration caused by torque ripple in the rotating electric machine 10. Moreover, since the elongate protrusions 47 are formed to radially overlap the cooling water passage 43, it is possible to more effectively reduce membrane vibration of the tubular part 21.

In the present embodiment, the elongate protrusions 47 include the first elongate protrusions 47 that extend in the first direction inclined from the axial direction to one side in the circumferential direction and the second elongate protrusions 47 that extend in the second direction inclined from the axial direction to the other side in the circumferential direction. Moreover, in the axial range where the elongate protrusions 47 radially overlap the cooling water passage 43, each of the first elongate protrusions 47 intersects a predetermined number of the second elongate protrusions 47; each of the second elongate protrusions 47 intersects a predetermined number of the first elongate protrusions 47. Consequently, it is possible to further improve the torsional rigidity of the tubular part 21 of the housing 14 and thereby more effectively reduce membrane vibration on the back side of the cooling water passage 43 (or on the external surface of the tubular part 21 on the opposite radial side to the stator 13) in comparison with the case of all the elongate protrusions 47 extending without intersecting each other.

Moreover, with the elongate protrusions 47 formed on the external surface of the tubular part 21 of the housing 14, the surface area of the housing 14 is increased, thereby facilitating air-cooling action in the housing 14. Furthermore, since the elongate protrusions 47 are formed to extend obliquely with respect to the axial direction, when the rotating electric machine 10 is installed in the vehicle so that the axial direction coincides with the direction of wind during traveling of the vehicle, it is easy for turbulence of wind to occur on the external surface of the tubular part 21 of the housing 14, thereby improving the air-cooling effect.

Moreover, with improvement in the rigidity of the housing 14, the durability of the rotating electric machine 10 against vibration and impact load can be improved, thereby improving the safety and reliability of the rotating electric machine 10 against external forces. Furthermore, in the case of the housing 14 being made by casting (e.g., low-pressure casting or die casting), it is possible to prevent cracking of the housing 14 caused by deformation of blowholes; it is also possible to prevent breakage of the housing 14 during the casting process. In addition, it is also possible to improve the sealing performance of the housing 14.

In the present embodiment, the bolts 16 are fastened to fix the cover 15 to the annular portion 24 (or axial end portion) of the tubular part 21 of the housing 14 at or in close vicinity to locations where the elongate protrusions 47 are integrally connected with the annular portion 24. In general, the housing 14 is configured to have high rigidity (e.g., have a large thickness) at locations where the fastening of the bolts 16 is performed. Therefore, with the elongate protrusions 47 integrally connected with the annular portion 24 of the tubular part 21 of the housing 14 at or in close vicinity to locations where the fastening of the bolts 16 is performed, it is possible to further improve the rigidity of the tubular part 21 of the housing 14.

In the present embodiment, the bolts 16 are fastened to fix the flange 22 of the housing 14 to the fixing target X at or in close vicinity to locations where the elongate protrusions 47 are integrally connected with the flange 22. As mentioned above, in general, the housing 14 is configured to have high rigidity at locations where the fastening of the bolts 16 is performed. Therefore, with the elongate protrusions 47 integrally connected with the flange 22 at or in close vicinity to locations where the fastening of the bolts 16 is performed, it is possible to further improve the rigidity of the tubular part 21 of the housing 14.

In the present embodiment, the elongate protrusions 47 are located to radially overlap the partition portions 46 (alternatively the pillar portions 49) that are provided in the cooling water passage 43 to radially connect the inner wall portion 41 and the outer wall portion 42. Consequently, it is possible to further improve the rigidity of the tubular part 21 of the housing 14, thereby more effectively reducing membrane vibration on the back side of the cooling water passage 43.

In the present embodiment, each of the elongate protrusions 47 is formed so that when viewed along the radial direction, it intersects (or crosses) the corresponding partition portions 46. Consequently, the elongate protrusions 47 and the partition portions 46, which are respectively provided on the radially outer and radially inner sides of the outer wall portion 42, radially overlap each other, thereby effectively reinforcing the outer wall portion 42. In addition, in the present embodiment, since the elongate protrusions 47 are formed to extend obliquely with respect to the axial direction, each of the elongate protrusions 47 intersects an increased number of the partition portions 46 and thereby more effectively reinforce the outer wall portion 42 in comparison with the case of the elongate protrusions 47 being formed to extend parallel to the axial direction.

In the present embodiment, each of the intersections P between the elongate protrusions 47 is located to radially overlap one of the partition portions 46. Consequently, it is possible to further improve the rigidity of the tubular part 21 of the housing 14.

In the present embodiment, the stator 13 is fixed, by shrinkage fitting or press fitting, to the tubular part 21 of the housing 14 with the predetermined interference therebetween. Therefore, circumferential stress may remain in the tubular part 21 of the housing 14. In this regard, with improvement in the rigidity of the tubular part 21, it is possible to suppress deformation of the housing 14 due to residual circumferential stress in the tubular part 21, thereby preventing the performance of the rotating electric machine 10 from being deteriorated and problems from occurring during the assembly of the rotating electric machine 10. In addition, since deformation of the housing 14 can be suppressed, it is accordingly possible to maintain suitable contact between the tubular part 21 and the stator core 32, thereby facilitating heat conduction from the stator 13 to the housing 14 and thus improving the cooling performance of the rotating electric machine 10.

In the present embodiment, in the slots 31 of the stator core 32, there are received the electric conductor wires 34 that have a rectangular cross-sectional shape and together form the stator coil 33. With this configuration, the space factors of the stator coil 33 in the slots 31 are improved. Moreover, the circumferential rigidity of the stator core 32 is increased. On the other hand, in the case of the stator core 32 being shrinkage-fitted or press-fitted to the tubular part 21 of the housing 14 with an interference therebetween, the circumferential stress remaining in the tubular part 21 is increased. However, with improvement in the rigidity of the tubular part 21, it is still possible to prevent problems from occurring due to the residual circumferential stress.

In the present embodiment, all of the inner wall portion 41, the outer wall portion 42, the partition portions 46 and the elongate protrusions 47 of the tubular part 21 of the housing 14 are formed integrally into one piece. Consequently, it is possible to further improve the rigidity of the tubular part 21 of the housing 14.

In the present embodiment, the cooling water passage 43 is partitioned by the partition portions 46 into the four cooling water passage sections. Consequently, it becomes possible to reduce the area of each cooling water passage section where membrane vibration occurs, thereby suppressing harmonic noise caused by the membrane vibration. Moreover, with the partition portions 46 provided in the cooling water passage 43, it becomes possible to increase the contact area between the housing 14 and the cooling water and the flow speed of the cooling water in the cooling water passage 43, thereby facilitating heat exchange between the housing 14 and the cooling water.

Second Embodiment

A rotating electric machine 10 according to the second embodiment has a similar structure to the rotating electric machine 10 according to the first embodiment. Therefore, the differences therebetween will be mainly described hereinafter.

Figure 9:
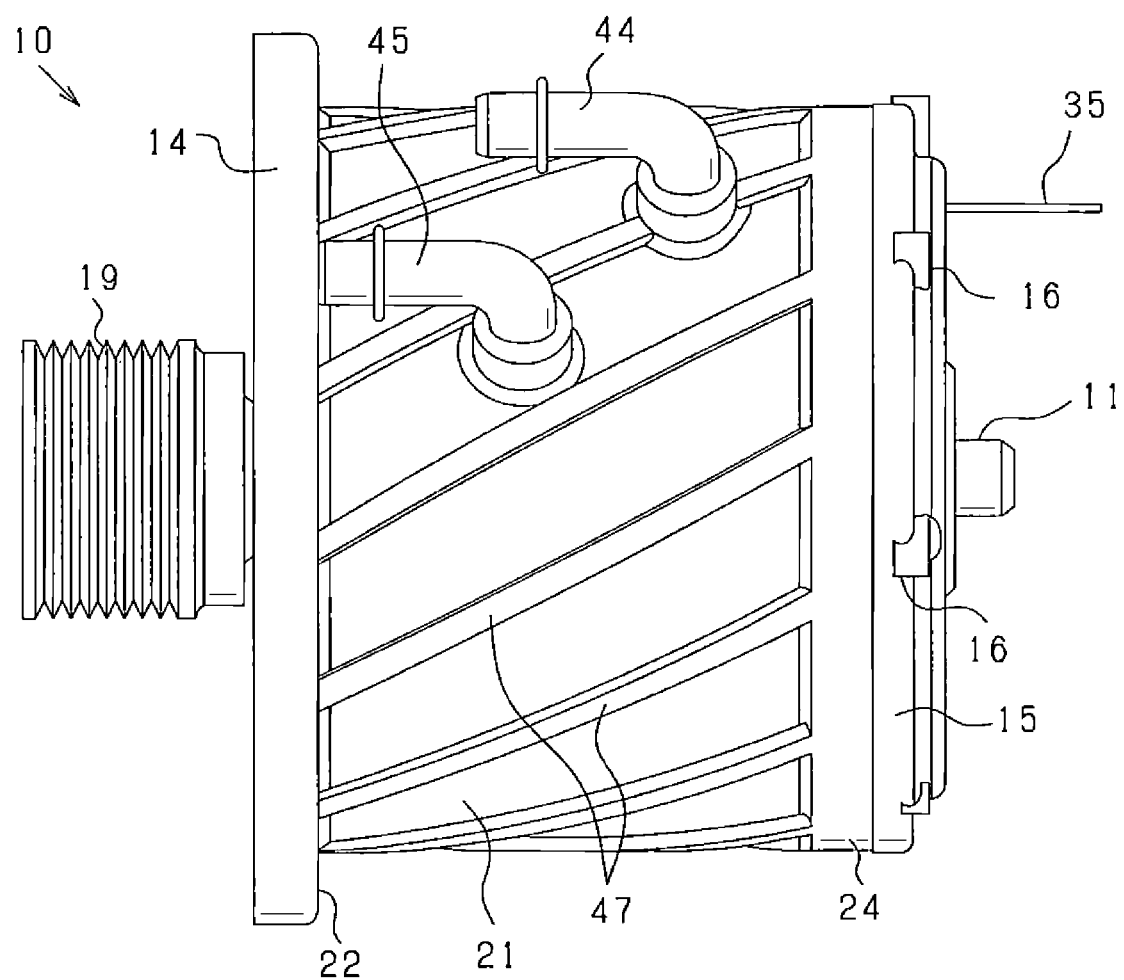
FIG. 9 is a front view showing the external appearance of a rotating electric machine according to a second embodiment.
Figure 10:
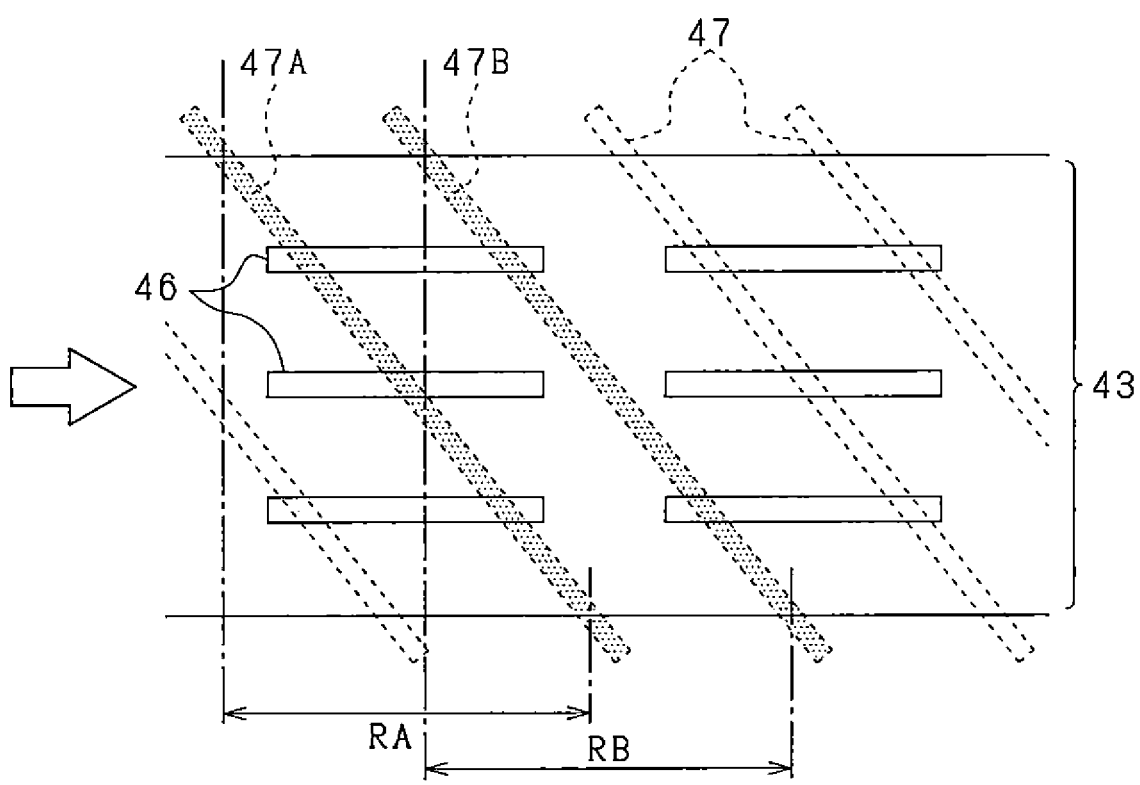
FIG. 10 is a development of part of a cooling water passage formed in a tubular part of a housing of the rotating electric machine according to the second embodiment.

FIG. 9 shows the external appearance of the rotating electric machine 10 according to the present embodiment. FIG. 10 shows the configuration of the elongate protrusions 47 according to the present embodiment.

As shown in FIG. 9, in the present embodiment, all the elongate protrusions 47 extend, at least in the axial range where the elongate protrusions 47 radially overlap the cooling water passage 43, obliquely to the axial direction and parallel to each other. Moreover, all the elongate protrusions 47 are spaced at predetermined intervals in the circumferential direction. In addition, each of the elongate protrusions 47 is integrally connected with both the flange 22 formed at one axial end of the tubular part 21 of the housing 14 and the annular portion 24 formed at the other axial end of the tubular part 21.

As shown in FIG. 10, when viewed along the radial direction, each of the elongate protrusions 47 intersects (or crosses) the corresponding partition portions 46. Moreover, in the axial range where the elongate protrusions 47 radially overlap the cooling water passage 43 (i.e., in the axial range corresponding to the width of the annular cooling water passage 43), for each circumferentially-adjacent pair of the elongate protrusions 47, the circumferential range where one of the circumferentially-adjacent pair of the elongate protrusions 47 is provided and the circumferential range where the other of the circumferentially-adjacent pair of the elongate protrusions 47 is provided partially overlap each other.

For example, in FIG. 10, for the circumferentially-adjacent pair of the elongate protrusions 47A and 47B, the circumferential range RA where the elongate protrusion 47A is provided and the circumferential range RB where the elongate protrusion 47B is provided partially overlap each other.

With the above configuration of the elongate protrusions 47 according to the present embodiment, it is possible to further improve the torsional rigidity of the tubular part 21 of the housing 14 and thereby more effectively reduce membrane vibration on the back side of the cooling water passage 43 in comparison with the case of configuring the elongate protrusions 47 to have their circumferential ranges not overlapping each other.

In addition, in the present embodiment, the partition portions 46 may be configured as in any of the configuration examples shown in FIGS. 5-7. Moreover, as connecting portions that radially connect the inner wall portion 41 and the outer wall portion 42, in the cooling water passage 43, there may be formed pillar portions 49 as shown in FIG. 8 instead of the partition portions 46.

Third Embodiment

A rotating electric machine 10 according to the third embodiment has a similar structure to the rotating electric machine 10 according to the first embodiment. Therefore, the differences therebetween will be mainly described hereinafter.

Figure 11:
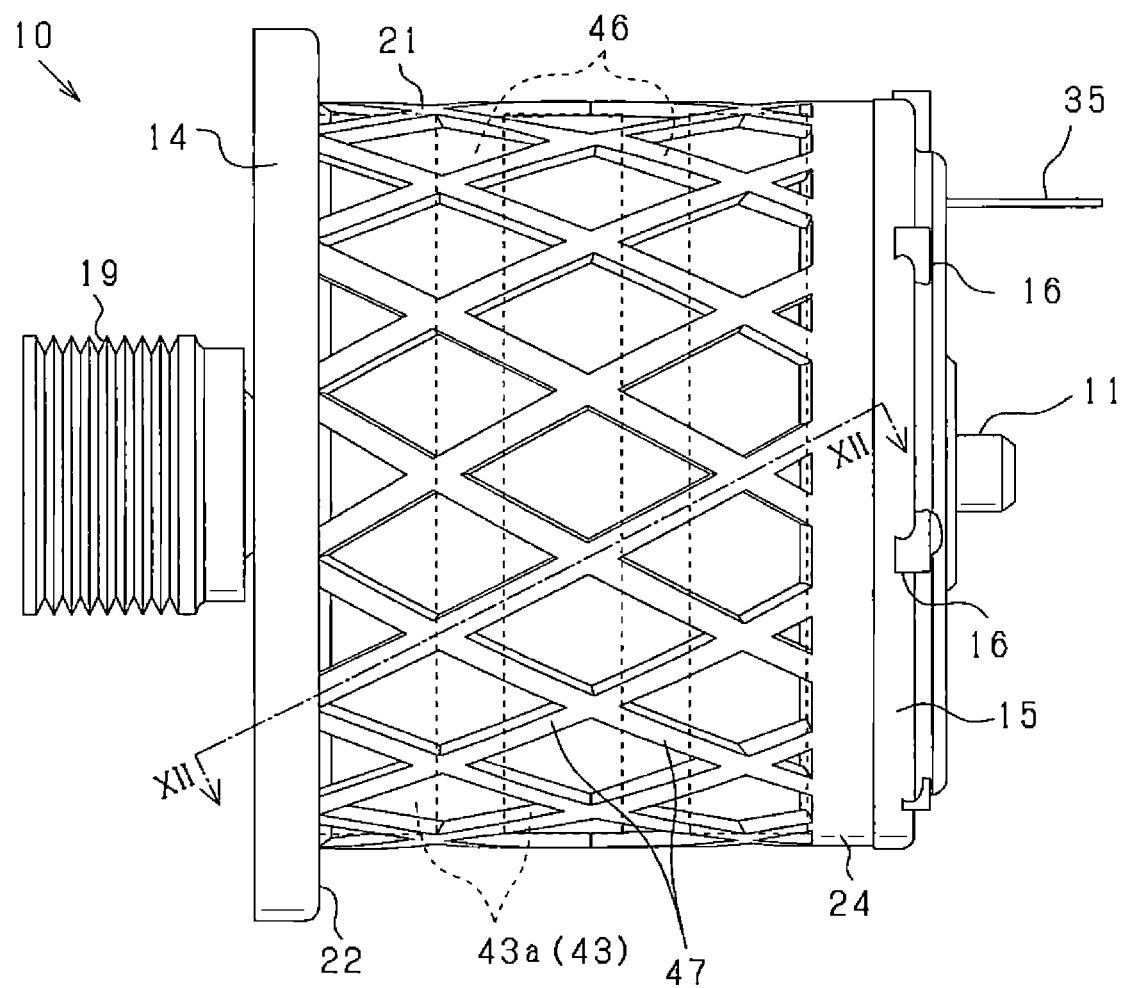
FIG. 11 is a front view showing the external appearance of a rotating electric machine according to a third embodiment.
Figure 12:
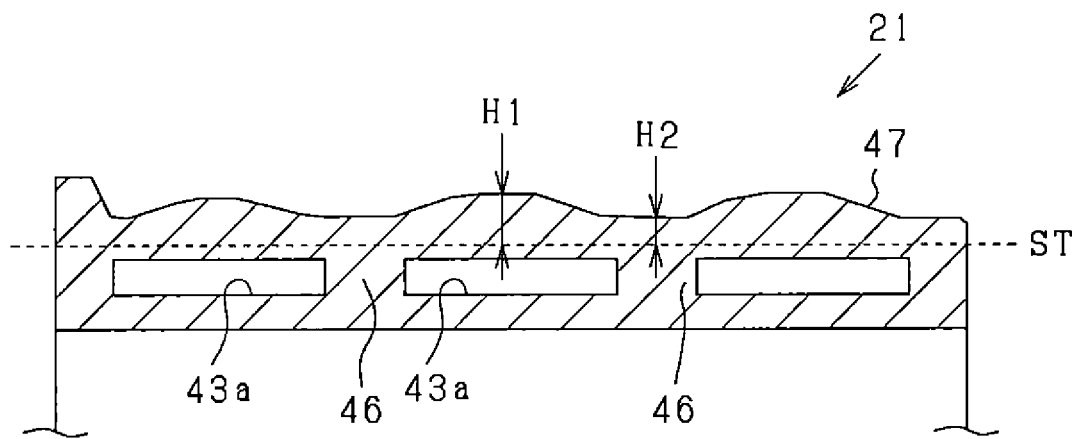
FIG. 12 is a cross-sectional view taken along the line XII-XII in FIG. 11.

FIG. 11 shows the external appearance of the rotating electric machine 10 according to the present embodiment. FIG. 12 shows a cross section of one of the elongate protrusions 47 according to the present embodiment, which is taken along the longitudinal direction of the elongate protrusion 47 (i.e., along the line XII-XII in FIG. 11).

In the present embodiment, as described in the first embodiment with reference to FIG. 2, the stator 13 includes the stator core 32 and the stator coil 33 wound on the stator core 32. The stator core 32 is assembled to the tubular part 21 of the housing 14 on the radially inner side of the tubular part 21. More specifically, the stator core 32 is fixed, for example by shrinkage fitting or press fitting, to the tubular part 21 of the housing 14 with a predetermined interference therebetween.

Moreover, in the tubular part 21 of the housing 14, there is formed the annular cooling water passage 43 that extends in the circumferential direction. The cooling water passage 43 is partitioned by a plurality of partition portions 46 into a plurality (e.g., three in the present embodiment) of cooling water passage sections 43*a* in the axial direction. Each of the elongate protrusions 47 has large-height portions each extending in the longitudinal direction of the elongate protrusion 47 to cross the cooling water passage 43 and small-height portions each extending in the longitudinal direction of the elongate protrusion 47 without crossing the cooling water passage 43.

More specifically, as shown in FIG. 12, each of the large-height portions extends in the longitudinal direction of the elongate protrusion 47 to cross a corresponding one of the cooling water passage sections 43*a*. On the other hand, each of the small-height portions extends in the longitudinal direction of the elongate protrusion 47 to cross a corresponding one of the partition portions 46. The radial height H1 of the large-height portions is set to be larger than the radial height H2 of the small-height portions (i.e., H1>H2). Here, the radial heights H1 and H2 denote the distances by which these portions of the elongate protrusion 47 protrude radially outward from the external surface ST of the tubular part 21 of the housing 14.

In FIG. 12, each of the large-height portions is concave in shape whereas each of the small-height portions is convex in shape. Moreover, the large-height portions and the small-height portions are connected by slopes provided therebetween.

Figure 13:
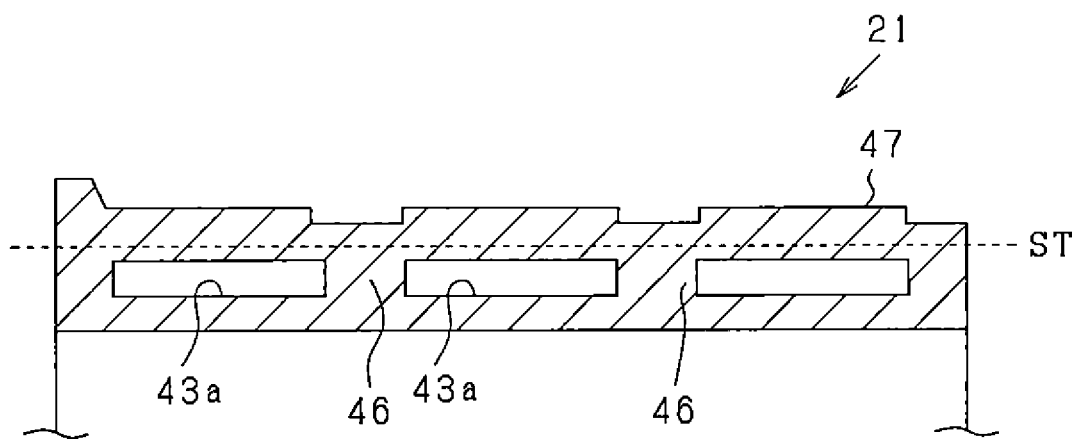
FIG. 13 is a longitudinal cross-sectional view of an elongate protrusion according to a modification of the third embodiment.

As an alternative, as shown in FIG. 13, each of the large-height and small-height portions may have a rectangular cross-sectional shape. In this case, the large-height portions and the small-height portions are directly connected without slopes provided therebetween.

Moreover, in FIGS. 12 and 13, in the longitudinal direction of the elongate protrusion 47, the width of each of the large-height portions is set to be equal to the width of each of the cooling water passage sections 43*a*. However, though not shown in the figures, the width of each of the large-height portions may alternatively be set to be smaller or larger than the width of each of the cooling water passage sections 43*a*.

In the present embodiment, since the radial height H1 of the large-height portions, each of which extends to cross the cooling water passage 43, is set to be larger, it is possible to reinforce those parts of the outer wall portion 42 which correspond to the antinodes of membrane vibration of the tubular part 21, thereby effectively reducing the membrane vibration. Moreover, since each of the elongate protrusions 47 is shaped to be concave and convex in the longitudinal direction thereof, the surface area of the housing 14 is further increased, thereby further improving the air-cooling effect. Furthermore, since the radial height H2 of the small-height portions, each of which extends without crossing the cooling water passage 43, is set to be smaller, it is possible to suppress the weight and size of the entire housing 14 from being increased.

In the present embodiment, the stator core 32 is fixed, by shrinkage fitting or press fitting, to the tubular part 21 of the housing 14 with the predetermined interference therebetween. Therefore, radial stress (residual stress) may be induced in the tubular part 21 and the amplitude of the radial stress at those portions of the tubular part 21 where the cooling water passage 43 (i.e., a cavity) is formed may be different from that at the other portions of the tubular part 21. In this case, due to the variation in the radial stress in the tubular part 21, there would be variation in the joining state between the tubular part 21 and the stator core 32, thereby affecting heat conduction from the stator core 32 to the tubular part 21 and making it impossible to reliably retain the stator core 32 by the tubular part 21.

In this regard, in the present embodiment, each of the elongate protrusions 47 is configured to have the large-height portions each extending in the longitudinal direction of the elongate protrusion 47 to cross the cooling water passage 43 and the small-height portions each extending in the longitudinal direction of the elongate protrusion 47 without crossing the cooling water passage 43; the radial height H1 of the large-height portions is set to be larger than the radial height H2 of the small-height portions. With this configuration, it is possible to reduce variation in the radial stress in the tubular part 21, thereby facilitating heat conduction from the stator core 32 to the tubular part 21 and making it possible to reliably retain the stator core 32 by the tubular part 21.

Moreover, in the present embodiment, the partition portions 46 are formed at axially intermediate positions in the tubular part 21, i.e., at intermediate positions between opposite axial ends of the cooling water passage 43. Consequently, with the partition portions 46, the radial fastening force of the tubular part 21 of the housing 14 to the stator core 32 is secured at the axially intermediate positions in the tubular part 21. Further, setting the radial height H1 of the large-height portions of the elongate protrusions 47 to be larger than the radial height H2 of the small-height portions of the elongate protrusions 47, it is possible to realize stress equalization in the tubular part 21 of the housing 14.

In addition, with the elongate protrusions 47 formed to extend obliquely with respect to the axial direction, it is possible to more reliably realize stress equalization in the entire tubular part 21 of the housing 14.

Fourth Embodiment

A rotating electric machine 10 according to the fourth embodiment has a similar structure to the rotating electric machine 10 according to the first embodiment. Therefore, the differences therebetween will be mainly described hereinafter.

In the first embodiment, the elongate protrusions 47 are formed to extend obliquely with respect to the axial direction (see FIGS. 5-8).

Figure 14:
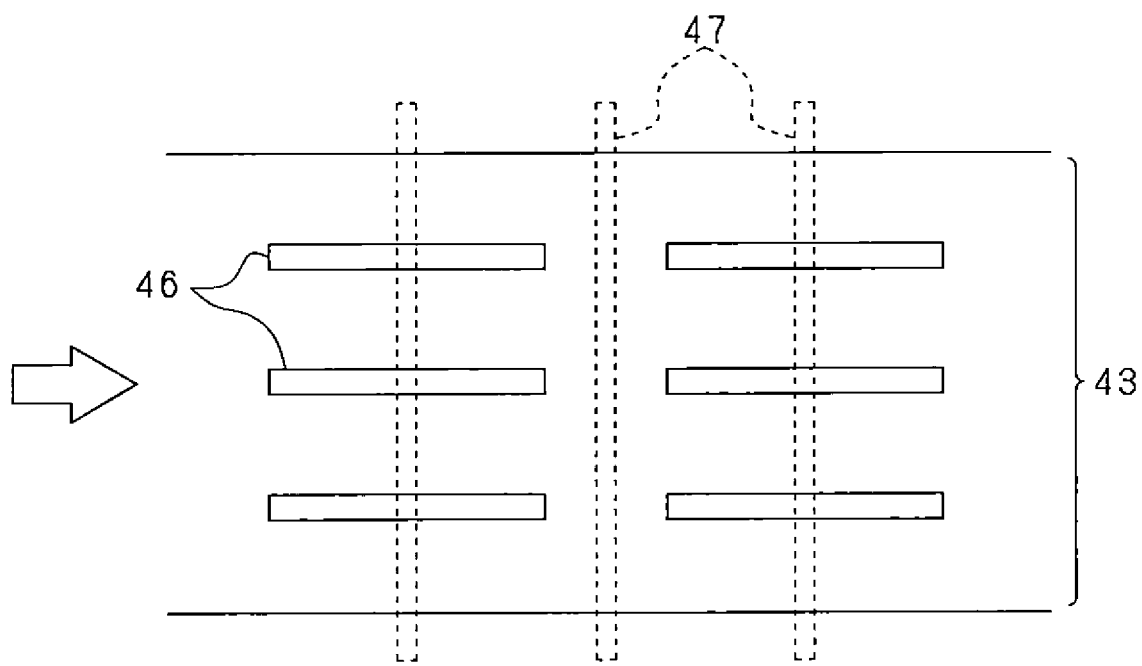
FIG. 14 is a development of part of a cooling water passage formed in a tubular part of a housing of a rotating electric machine according to a fourth embodiment.

In contrast, in the present embodiment, as shown in FIG. 14, on the external surface of the tubular part 21 of the housing 14 on the radially outer side (i.e., on the opposite radial side to the stator 13), the elongate protrusions 47 are formed, in the axial range where the elongate protrusions 47 radially overlap the cooling water passage 43, to extend parallel to the axial direction. That is, the elongate protrusions 47 are formed to extend perpendicular to the circumferential direction.

In addition, though not shown in the figures, as an alternative, some of the elongate protrusions 47 may be formed to extend obliquely with respect to the axial direction whereas the remaining elongate protrusions 47 may be formed to extend parallel to the axial direction.

Fifth Embodiment

A rotating electric machine 10 according to the fifth embodiment has a similar structure to the rotating electric machine 10 according to the first embodiment. Therefore, the differences therebetween will be mainly described hereinafter.

In the first embodiment, the housing 14 is made by molding using a core for forming the cooling water passage 43. Consequently, all of the inner wall portion 41, the outer wall portion 42, the partition portions 46 and the elongate protrusions 47 of the tubular part 21 are formed integrally into one piece.

In contrast, in the present embodiment, the inner wall portion 41 and the outer wall portion 42 of the tubular part 21 are formed separately and then assembled together to form the cooling water passage 43 therebetween.

Figure 15:
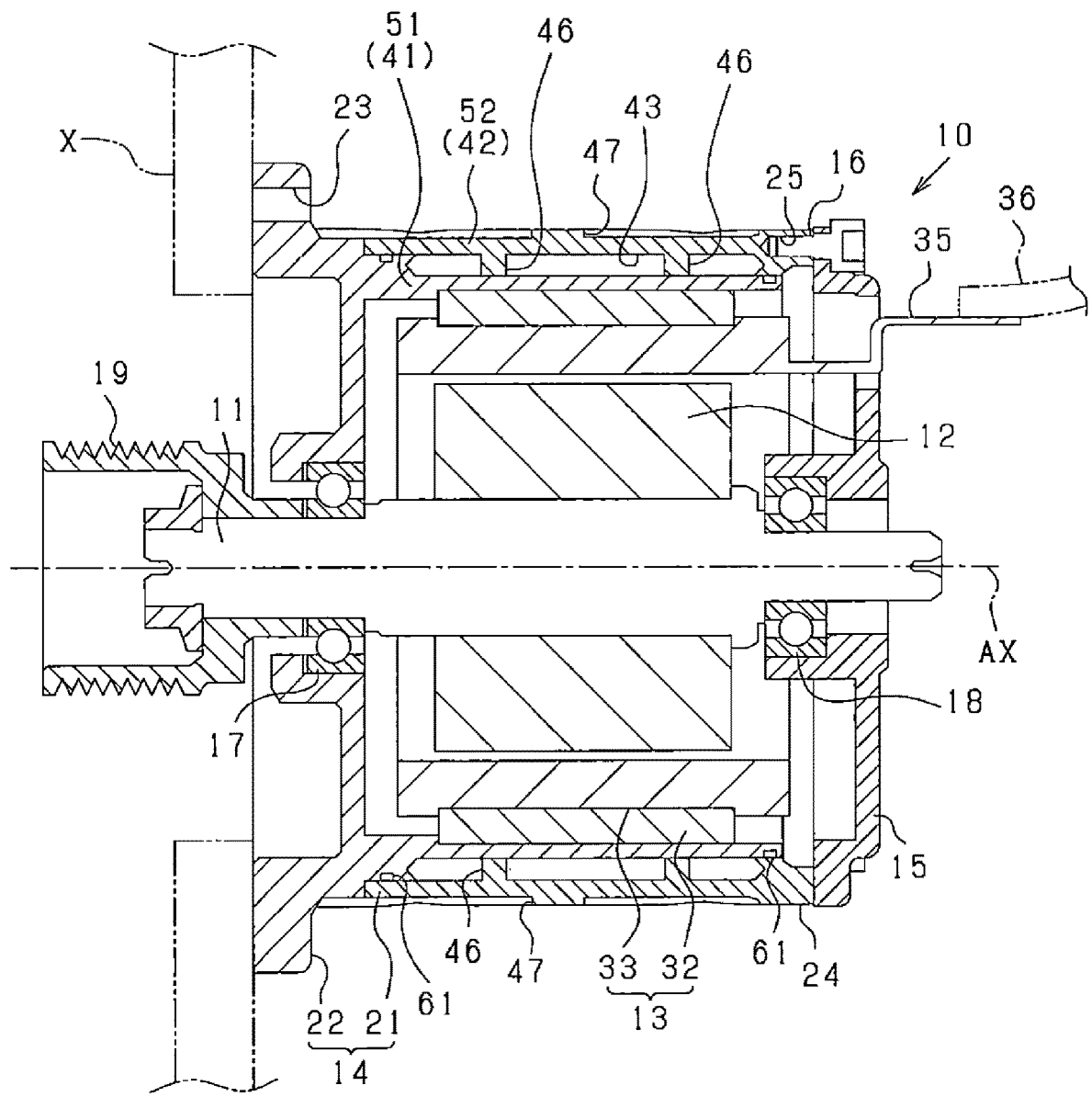
FIG. 15 is a longitudinal cross-sectional view of a rotating electric machine according to a fifth embodiment.

Specifically, as shown in FIG. 15, in the present embodiment, the tubular part 21 of the housing 14 is formed by joining an inner tubular member 51 and an outer tubular member 52 to each other. The inner tubular member 51 has the inner wall portion 41 of the tubular part 21 formed therein. More specifically, the inner tubular member 51 has a circumferential wall portion that constitutes the inner wall portion 41 of the tubular part 21. On the other hand, the outer tubular member 52 has the outer wall portion 42 of the tubular part 21 formed therein. More specifically, the outer tubular member 52 has a circumferential wall portion that constitutes the outer wall portion 42 of the tubular part 21.

The outer tubular member 52 is located radially outside the inner tubular member 51 to surround the inner tubular member 51. Between the inner tubular member 51 and the outer tubular member 52, there is formed the annular cooling water passage 43 that extends in the circumferential direction.

On an inner circumferential surface of the outer tubular member 52, there are formed the partition portions 46 of the tubular part 21 to protrude radially inward from the inner circumferential surface of the outer tubular member 52. Each of the partition portions 46 has its distal end abutting an outer circumferential surface of the inner tubular member 51. It should be noted that each of the partition portions 46 may alternatively have its distal end separated from the outer circumferential surface of the inner tubular member 51.

In addition, as an alternative, the partition portions 46 of the tubular part 21 may be formed on the outer circumferential surface of the inner tubular member 51 to protrude radially outward from the outer circumferential surface. As another alternative, some of the partition portions 46 may be formed on the outer circumferential surface of the inner tubular member 51 whereas the remaining partition portions 46 may be formed on the inner circumferential surface of the outer tubular member 52.

Between joining portions of the inner tubular member 51 and the outer tubular member 52, there are interposed seal members 61 and 62 to seal the cooling water passage 43. The seal members 61 and 62 are respectively provided on opposite axial sides of the cooling water passage 43 in the tubular part 21. More specifically, recesses may be formed in joining surfaces of the inner tubular member 51 or the outer tubular member 52; the seal members 61 and 62 may be arranged respectively in the recesses. In addition, each of the seal members 61 and 62 may be implemented by a gasket, a liquid gasket or an O-ring.

In the present embodiment, when torsional deformation of the tubular part 21 of the housing 14 occurs, the sealing performance of the seal members 61 and 62 may be lowered due to the torsional deformation. For example, local reduction in compressive force may occur at locations where the seal members 61 and 62 are provided, thereby causing leakage of the cooling water.

In this regard, in the rotating electric machine 10 according to the present embodiment, the elongate protrusions 47 are formed in the tubular part 21 of the housing 14, thereby improving the torsional rigidity of the tubular part 21. Consequently, it is possible to suppress torsional deformation of the tubular part 21 of the housing 14, thereby suppressing the sealing performance of the seal members 61 and 62 from being lowered.

While the above particular embodiments have been shown and described, it will be understood by those skilled in the art that various modifications, changes, and improvements may be made without departing from the spirit of the present disclosure.

For example, in the above-described embodiments, the tubular part 21 of the housing 14 has the partition portions 46 formed in the cooling water passage 43 to partition the cooling water passage 43 into the plurality of cooling water passage sections in the axial direction. Alternatively, the tubular part 21 of the housing 14 may have no partition portion formed in the cooling water passage 43. In this case, the cooling water passage 43 is not portioned into a plurality of cooling water passage sections in the axial direction.

In the above-described embodiments, root portions of the elongate protrusions 47 along the longitudinal direction may be configured as taper surfaces or concave curved surfaces. In this case, it is possible to suppress stress concentration at the root portions of the elongate protrusions 47.

In the above-described embodiments, the elongate protrusions 47 are formed to extend straight obliquely or parallel to the axial direction. Alternatively, the elongate protrusions 47 may be formed to spirally extend on the external surface of the tubular part 21 of the housing 14. Moreover, in this case, one or more strips may be spirally wound on the external surface of the tubular part 21 to form the elongate protrusions 47.

In the above-described embodiments, cooling water is employed, as the coolant for cooling the rotating electric machine 10, to flow through the cooling water passage 43. Alternatively, a gaseous coolant may be employed as the coolant for cooling the rotating electric machine 10. In this case, the cooling water passage 43 constitutes a gaseous coolant passage through which the gaseous coolant flows.

In the above-described embodiments, the stator coil 33 is formed of the electric conductor wires 34 that have a rectangular cross-sectional shape and are inserted the slots 31 of the stator core 32. As an alternative, the stator coil 33 may be formed of electric conductor wires that have a circular cross sectional shape and are inserted the slots 31 of the stator core 32. As another alternative, the stator coil 33 may be formed of electric conductor wires concentratedly wound on bobbins formed in core segments; the core segments are assembled together to form the stator core 32. As yet another alternative, the stator coil 33 may be formed by laminating pressed electric conductors. Furthermore, the stator 13 may alternatively be configured as a coreless stator, i.e., a stator without the stator core 32.

In the above-described embodiments, the stator core 32 is fitted to the tubular part 21 of the housing 14 with the predetermined interference therebetween. As an alternative, the stator core 32 may be fitted to the tubular part 21 of the housing 14 without an interference therebetween.

In the above-described embodiments, the pulley 19 is employed as a mechanical power transmitting device in the rotating electric machine 10. Alternatively, splines, gears, couplings or chains may be employed as the mechanical power transmitting device. In addition, with improvement in the rigidity of the housing 14, it is possible to suppress deformation of the housing 14 even when radial and axial forces are applied from the mechanical power transmitting device to the rotating shaft 11.

In the above-described embodiments, the rotating electric machine 10 is configured as an inner rotor type machine. As an alternative, the rotating electric machine 10 may be configured as an outer rotor type machine. In this case, the rotating electric machine 10 has a rotor 12 arranged radially outside a stator 13 to radially face the stator 13. Moreover, the rotating electric machine 10 includes a housing 14 that has a tubular part 21 assembled to the stator 13 on the radially inner side of the stator 13. More specifically, the tubular part 21 of the housing 14 is fitted to a stator core 32 of the stator 13 with a predetermined interference therebetween. In the tubular part 21 of the housing 14, there is formed a cooling water passage 43 between an inner wall portion 41 and an outer wall portion 42 of the tubular part 21. The cooling water passage 43 is partitioned by partition portions 46 in the axial direction into a plurality of cooling water passage sections. Furthermore, on an external surface of the tubular part 21 of the housing 14 on the radially inner side (i.e., on the opposite radial side to the stator 13), elongate protrusions 47 are formed, in an axial range where the elongate protrusions 47 radially overlap the cooling water passage 43, to extend obliquely or parallel to the axial direction. In addition, in the cooling water passage 43, there may be formed pillar portions 49 instead of the partition portions 46.

What is claimed is:

1. A rotating electric machine comprising:
a rotating shaft having a longitudinal axis;
a rotor fixed on the rotating shaft;
a stator that radially faces the rotor; and
a housing having an integral tubular part,
wherein
the stator is on a radially inner side or a radially outer side of the tubular part,
the tubular part has an inner wall portion and an outer wall portion that (1) extend axially, (2) are radially spaced from and radially face each other and (3) radially overlap along the longitudinal axis,
the tubular part is configured such that an annular coolant passage through which coolant flows is between the inner wall portion and outer wall portion in a radial direction, and
the tubular part includes at least one elongated protrusion on an opposite side of the tubular part from the stator that (1) protrudes away from the stator, (2) extends obliquely or parallel to the longitudinal axis and (3) overlaps the coolant passage in the radial direction.

2. The rotating electric machine as set forth in claim 1, wherein
the at least one elongate protrusion comprises a first elongate protrusion extending in a first direction inclined from the longitudinal axis to one side in a circumferential direction and a second elongate protrusion extending in a second direction inclined from the longitudinal axis to the other side in the circumferential direction, and
the first elongate protrusion and the second elongate protrusion intersect at an intersection that radially overlaps the coolant passage.

3. The rotating electric machine as set forth in claim 1, wherein
the at least one elongate protrusion comprises first and second elongate protrusions which extend obliquely to the longitudinal axis and parallel to each other and which are spaced in a circumferential direction, and
the first elongate protrusion and the second elongate protrusion partially overlap at a location that radially overlaps the coolant passage.

4. The rotating electric machine as set forth in claim 1, further comprising a cover that is fixed to an axial end portion of the tubular part of the housing by a plurality of fastening members,
wherein
the at least one elongate protrusion comprises a plurality of elongate protrusions that are integrally connected with the axial end portion of the tubular part, and
the fastening members fix the cover to the axial end portion of the tubular part at or in close vicinity to locations where the plurality of elongate protrusions are integrally connected with the axial end portion of the tubular part.

5. The rotating electric machine as set forth in claim 1, wherein
the housing has a flange that radially protrudes from an axial end portion of the tubular part,
the flange is fixed to a fixing target by a plurality of fastening members,
the at least one elongate protrusion comprises a plurality of elongate protrusions that are integrally connected with the flange, and
the plurality of fastening members fix the flange to the fixing target at or in close vicinity to locations where the plurality of elongate protrusions are integrally connected with the flange.

6. The rotating electric machine as set forth in claim 1, wherein
the tubular part of the housing includes an inner tubular member having the inner wall portion and an outer tubular member having the outer wall portion, and
the inner tubular member and the outer tubular member are with seal members between the inner tubular member and the outer tubular member to seal the coolant passage.

7. The rotating electric machine as set forth in claim 1, wherein
the tubular part has a connecting portion in the coolant passage that radially connects the inner wall portion and the outer wall portion, and
the at least one elongate protrusion radially overlaps the connecting portion.

8. The rotating electric machine as set forth in claim 7, wherein the connecting portion is a partition portion that extends between the inner wall portion and the outer wall portion to partition the coolant passage, and the at least one elongate protrusion intersects the partition portion when viewed along the radial direction.

9. The rotating electric machine as set forth in claim 7, wherein the at least one elongate protrusion comprises a first elongate protrusion extending in a first direction inclined from the longitudinal axis to one side in a circumferential direction and a second elongate protrusion extending in a second direction inclined from the longitudinal axis to the other side in the circumferential direction, the first elongate protrusion and the second elongate protrusion intersect at an intersection, and the intersection between the first elongate protrusion and the second elongate protrusion radially overlaps the connecting portion.

10. The rotating electric machine as set forth in claim 1, wherein the at least one elongate protrusion has a large-height portion and a small-height portion, the large-height portion extending in a longitudinal direction of the at least one elongate protrusion to cross the coolant passage, the small-height portion extending in the longitudinal direction of the at least one elongate protrusion without crossing the coolant passage, and a radial height of the large-height portion is larger than a radial height of the small-height portion.

11. The rotating electric machine as set forth in claim 10, wherein the stator includes a stator core and a stator coil wound on the stator core, and the stator core is on the radially inner side or the radially outer side of the tubular part of with a predetermined interference between the tubular part and the stator core.

12. The rotating electric machine as set forth in claim 11, wherein the tubular part has a partition portion that extends in a circumferential direction between the inner wall portion and the outer wall portion to partition the coolant passage into coolant passage sections along the longitudinal axis, the large-height portion crosses one of the coolant passage sections in the longitudinal direction of the at least one elongate protrusion, and the small-height portion crosses the partition portion in the longitudinal direction of the at least one elongate protrusion.

* * * * *